(12) United States Patent
Warnicke et al.

(10) Patent No.: US 11,144,340 B2
(45) Date of Patent: Oct. 12, 2021

(54) PLACEMENT OF CONTAINER WORKLOADS TRIGGERED BY NETWORK TRAFFIC FOR EFFICIENT COMPUTING AT NETWORK EDGE DEVICES

(71) Applicant: Cisco Technology, Inc., San Jose, CA (US)

(72) Inventors: Ed Warnicke, Austin, TX (US); William Mark Townsley, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/152,267

(22) Filed: Oct. 4, 2018

(65) Prior Publication Data

US 2020/0110625 A1    Apr. 9, 2020

(51) Int. Cl.
| | |
|---|---|
| *G06F 15/16* | (2006.01) |
| *G06F 9/455* | (2018.01) |
| *G06F 9/50* | (2006.01) |
| *H04L 29/08* | (2006.01) |
| *H04L 29/06* | (2006.01) |
| *G06F 15/173* | (2006.01) |
| *H04L 12/931* | (2013.01) |

(52) U.S. Cl.
CPC ........ *G06F 9/45558* (2013.01); *G06F 9/5077* (2013.01); *G06F 9/5083* (2013.01); *H04L 67/1021* (2013.01); *H04L 67/141* (2013.01); *H04L 67/2814* (2013.01); *H04L 67/42* (2013.01); *G06F 2009/4557* (2013.01); *G06F 2009/45595* (2013.01); *H04L 49/70* (2013.01)

(58) Field of Classification Search
CPC ................. H04L 67/1021; H04L 67/2814

USPC ......................... 709/203, 223, 226
See application file for complete search history.

(56) References Cited

U.S. PATENT DOCUMENTS

| | | | |
|---|---|---|---|
| 6,014,700 A | 1/2000 | Bainbridge et al. | |
| 9,384,061 B1 | 7/2016 | Deivanayagam et al. | |
| 9,858,166 B1 | 1/2018 | Gong | |
| 2007/0043842 A1* | 2/2007 | Chouanard | ......... H04L 67/1034 709/223 |

(Continued)

FOREIGN PATENT DOCUMENTS

EP    2416542 A1    8/2012

OTHER PUBLICATIONS

International Search Report and Written Opinion of the International Searching Authority issued in PCT/US2019/052450, dated Nov. 22, 2019 (15 pages).

*Primary Examiner* — Hee Soo Kim
(74) *Attorney, Agent, or Firm* — Merchant & Gould P.C.

(57) ABSTRACT

In an embodiment, a method comprises, in response to receiving a packet that is associated with initiating a client-server session, transmitting a workload request to a workload orchestrator; the workload orchestrator selecting a selected server, from among a plurality of available geographically or logically distributed servers in network edge computing nodes, to process the client-server session; the workload orchestrator transmitting a request to the selected server to create a workload to process the client-server session; receiving, from the workload orchestrator, data identifying the selected server; forwarding one or more other packets associated with the same client-server session to the selected server; wherein the method is performed by one or more computing devices.

20 Claims, 5 Drawing Sheets

(56) References Cited

U.S. PATENT DOCUMENTS

| | | | |
|---|---|---|---|
| 2009/0282095 A1 | 11/2009 | Alami et al. | |
| 2011/0055312 A1* | 3/2011 | Purdy, Sr. | H04L 67/1002 709/203 |
| 2011/0283134 A1* | 11/2011 | Ma | H04L 43/0817 714/4.2 |
| 2011/0314119 A1* | 12/2011 | Kakadia | H04L 67/1002 709/213 |
| 2012/0036180 A1* | 2/2012 | Thornton | H04L 67/1023 709/203 |
| 2013/0191527 A1* | 7/2013 | Ashok | G06F 9/5072 709/224 |
| 2014/0310418 A1* | 10/2014 | Sorenson, III | H04L 67/1002 709/226 |
| 2014/0351402 A1 | 11/2014 | Madani et al. | |
| 2016/0217010 A1* | 7/2016 | Krishnan | H04L 67/38 |
| 2017/0192809 A1 | 7/2017 | Kaufer et al. | |
| 2018/0129541 A1 | 5/2018 | Alshinnawi et al. | |
| 2018/0285166 A1* | 10/2018 | Roy | G06F 12/08 |
| 2018/0287902 A1* | 10/2018 | Chitalia | H04L 43/045 |
| 2019/0037014 A1* | 1/2019 | Iland | H04L 67/18 |
| 2019/0052718 A1* | 2/2019 | Bedi | H04L 67/2842 |
| 2019/0082004 A1* | 3/2019 | Bosch | G06F 8/60 |
| 2019/0205172 A1* | 7/2019 | Arolovitch | H04L 67/1023 |
| 2019/0243687 A1* | 8/2019 | Chen | G06F 9/5072 |
| 2019/0324786 A1* | 10/2019 | Ranjan | G06F 9/5077 |

* cited by examiner

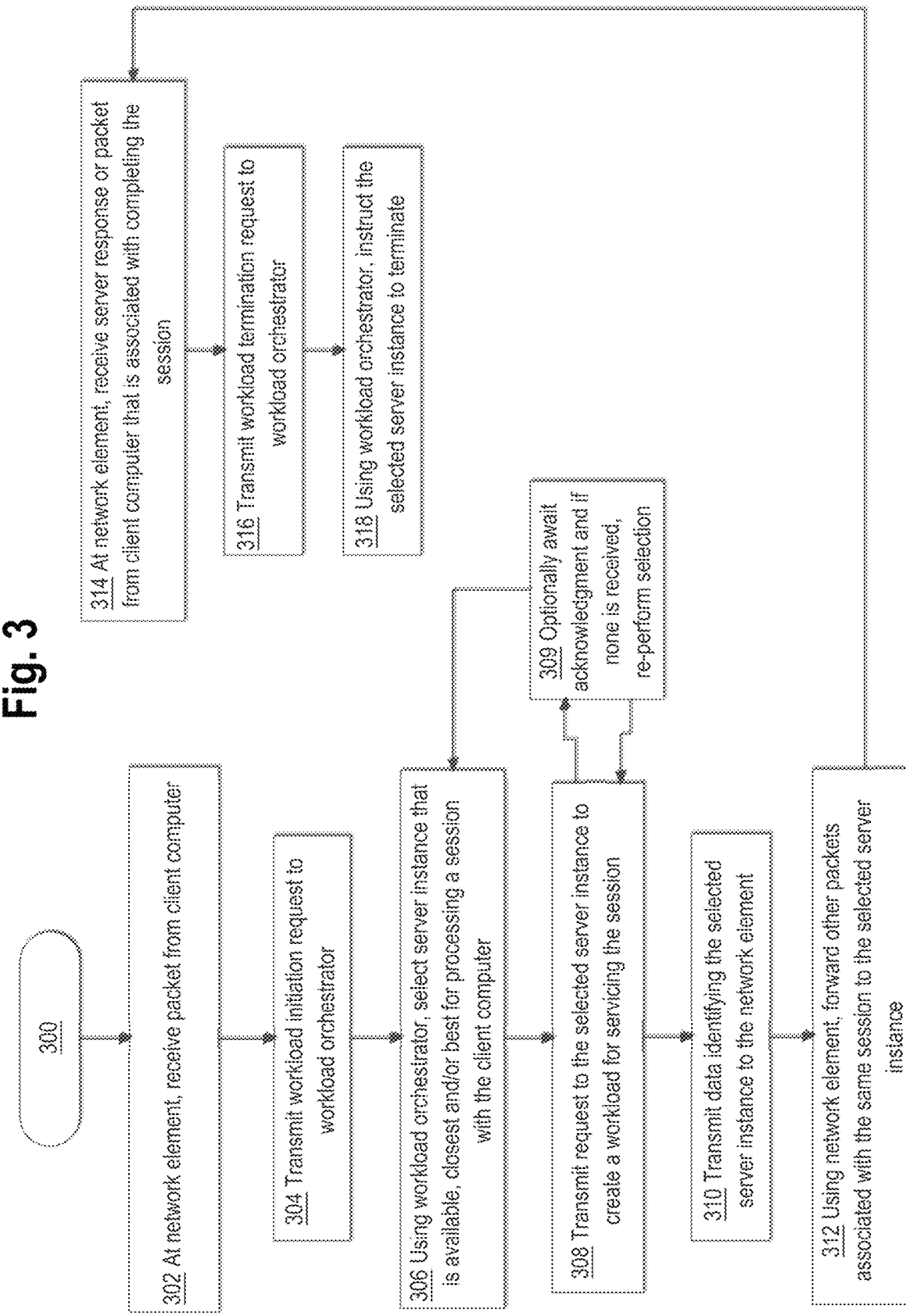

PLACEMENT OF CONTAINER WORKLOADS TRIGGERED BY NETWORK TRAFFIC FOR EFFICIENT COMPUTING AT NETWORK EDGE DEVICES

TECHNICAL FIELD

One technical field of the present disclosure is configuration of virtualized containers in computer networks. Another technical field is management of internetworking devices. Yet another technical field is workload management in virtual computing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Virtual computing systems, cloud computing services and cloud networks can be deployed using large numbers of internetworking devices and computing instances. Consequently, a computer that is executing an application program for a particular end user could be physically or logically located in a distant location in relation to the end user's computer, resulting in noticeable latency in machine response. A typical goal of network architects is to locate application programs at network devices that are closest to the end user, such as in computing devices located physically or logically at the edge of the network. Each edge node may comprise a site or cluster of multiple computing devices, and all edge nodes may be federated, but available CPU resources in edge nodes may be scarce due to high demand from among all applications or services. Therefore, placing execution workloads in the edge compute context should be placed as close as possible to the user machine only when there is a user machine to take advantage of them. The same issue arises in determining placement of microservices.

SUMMARY

The appended claims may serve as a summary of the invention.

BRIEF DESCRIPTION OF THE DRAWINGS

In the drawings:

FIG. 3 illustrates an example processing flow that can be programmed to implement an embodiment.

DETAILED DESCRIPTION

Figure 1:
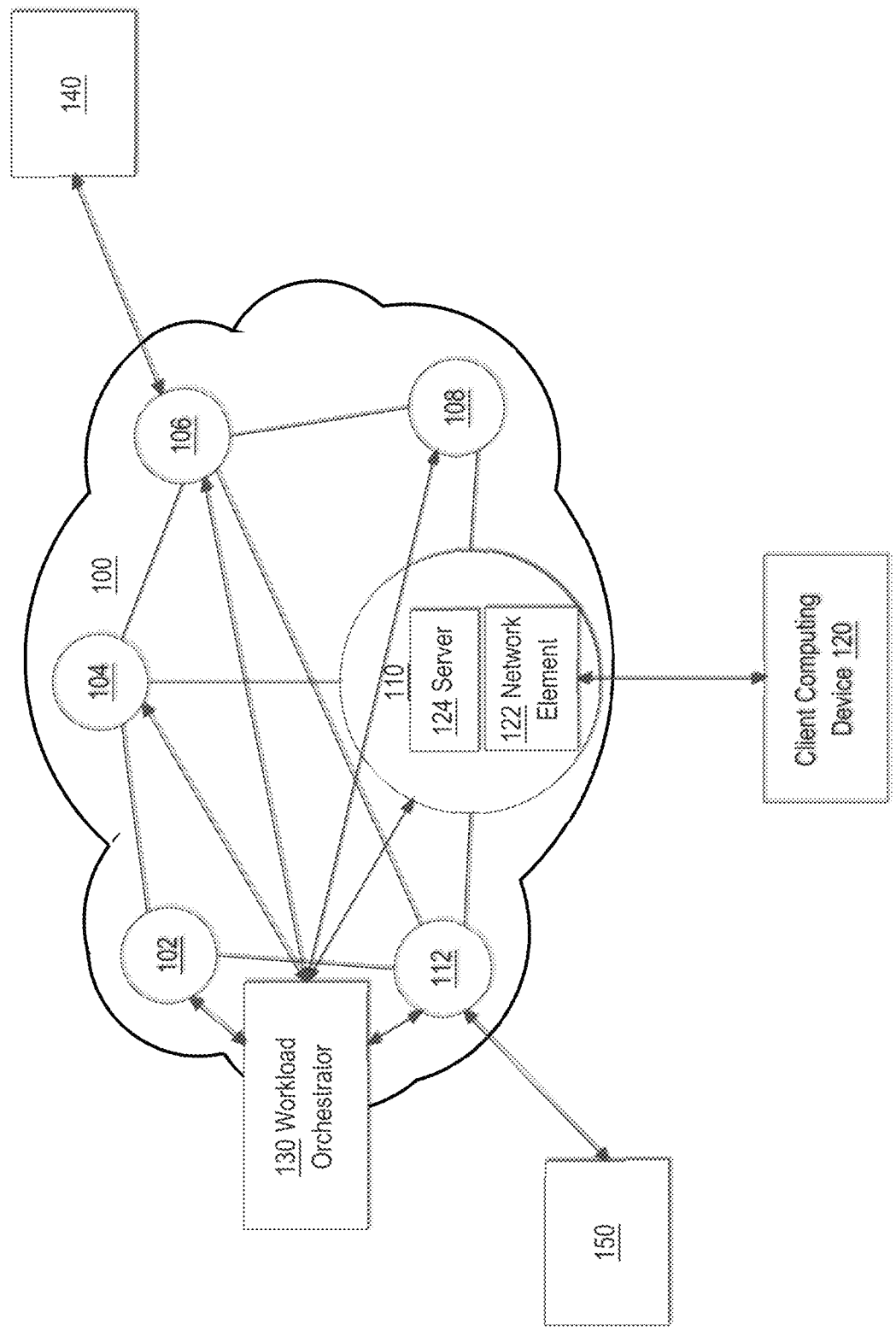
FIG. 1 illustrates an example networked, distributed computer system in which an embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:
1. GENERAL OVERVIEW
2. STRUCTURAL & FUNCTIONAL OVERVIEW
3. IMPLEMENTATION EXAMPLE—HARDWARE OVERVIEW
4. BENEFITS OF VARIOUS EMBODIMENTS

1. General Overview

The technical problem(s) outlined in the Background are solved using programmed computing devices arranged and configuration to operate as follows, in one embodiment. An application author specifies a policy about the desired location of workload execution for specified kinds of client requests. A client sends a packet which initiates a session or task that is suitable for mapping to a workload, and the packet is received at a first network element that is configured to forward the packet to a workload orchestrator. In response to receiving the packet, the workload orchestrator selects a computing device or other network element, which is located as close as possible to location specified in the policy, to run the workload. The selected network element launches a workload to consume the session, possibly by signaling a workload orchestration system to launch a workload locally. Thereafter, the first network element forwards all traffic of the session to the workload at the computing device. In one embodiment, the network element may store and forward session traffic while waiting for the workload to be available.

In an embodiment, workloads can be terminated in response to one or more pre-defined conditions or a combination of conditions. For example, a workload may be terminated after its session(s) are concluded, or after a set period after the workload is started, or after a set period of idle time. Each workload termination can be initiated by the workload itself, thus causing self-termination, or by the workload orchestrator.

In one embodiment, a method comprises, in response to receiving a packet that is associated with initiating a client-server session, transmitting a workload request to a workload orchestrator; the workload orchestrator selecting a selected server, from among a plurality of available geographically or logically distributed servers in network edge computing nodes, to process the client-server session; the workload orchestrator transmitting a request to the selected server to create a workload to process the client-server session; receiving, from the workload orchestrator, data identifying the selected server; forwarding one or more other packets associated with the same client-server session to the selected server; wherein the method is performed by one or more computing devices.

In another embodiment, a method executed in a network infrastructure element of a network edge computing node comprises, in response to receiving a packet that is associated with initiating a client-server session, selecting a selected server, from among a plurality of available geographically or logically distributed servers in a plurality of network edge computing nodes, to process the client-server session; transmitting a request to the selected server to create a workload to process the client-server session; forwarding one or more other packets associated with the same client-server session to the selected server; wherein the method is performed by one or more computing devices.

Various embodiments may use different techniques to initiate a workload based on a client network session. In one approach, termed strict triggering, a client network session can directly trigger the local creation of a network of workloads; while this approach is expected to offer lower latency, it may also be less efficient, as a workload network may be sparsely used. In another approach, termed lazy triggering, a client network session can, in a cascading fashion, trigger local creation of a network of workloads. For example, a first workload could send a session initiating packet to a second workload, thus causing the second workload to be spawned. This approach is expected to yield higher latency, but to be more efficient, as workloads in the network are only spawned as needed. With these techniques, localizing the network element that detects sessions and that spawns workloads at edge network devices allows client sessions to direct where and when workloads are placed, in a highly distributed, scalable, and efficient manner.

2. Structural & Functional Overview

2.1 Distributed Network Having Edge Compute Nodes

FIG. 1 illustrates an example networked, distributed computer system in which an embodiment could be implemented. For purposes of illustrating a clear example, FIG. 1 shows a limited number of functional elements, but practical embodiments may use any number of such elements.

In the example of FIG. 1, a network cloud 100 comprises a plurality of compute nodes 102, 104, 106, 108, 110, 112 that are logically and/or geographically distributed across the cloud, including some compute nodes that are logically and/or physically close to a client computing device 120 and other compute nodes that are distant or remote. The compute nodes 102, 104, 106, 108, 110, 112 may be communicatively coupled via links represented in FIG. 1 as arrows; in various embodiments different connectivity topologies may be used including partial mesh, full mesh or other.

Network cloud 100 further comprises a workload orchestrator 130, which may be implemented as an independent computer or virtual computing instance, or as a process, daemon or agent executing in a router, switch, other internetworking element, or other computer in the cloud. In various embodiments, workload orchestrator 130 may or may not reside on an internetworking element. In some embodiment, orchestration may be implemented using a round-robin approach, a consistent hash that is locally calculated, a random value selection or other approaches that do not require transmitting a request off of an internetworking device to determine where to place a workload. Example functions of workload orchestrator 130 are described in other sections herein.

Each of the compute nodes 102, 104, 106, 108, 110, 112 comprises at least one network element 122, as shown in FIG. 1 for node 110 as an example. The network element 122 may comprise a router, switch, firewall, gateway or other internetworking element that is programmed to receive packets or flows from the client computing device 120 and forward, route, classify or process packets or flows including selectively forwarding to other compute nodes and/or the workload orchestrator 130 depending on attributes of the packets or flows. In an embodiment, each of the compute nodes 102, 104, 106, 108, 110, 112 further comprises zero or more servers 124, each of which may be implemented as a computer, process, micro-service, or virtual computing instance with or without the use of virtualized containerization. At least one of the compute nodes 102, 104, 106, 108, 110, 112 in cloud 100 has at least one server 124. Each server 124 in the cloud 100 is programmed to implement an application, service and/or microservice, including receiving requests from client computing device 120, performing data processing services, transformations or calculations and responding to the requests.

Network cloud 100 also may have connections to external elements 140, 150 such as computers, networks, management or analysis systems. Examples include third-party web services that support the services that are provided by server 124 to client computing device 120.

2.2 Functional Example

Figure 2:
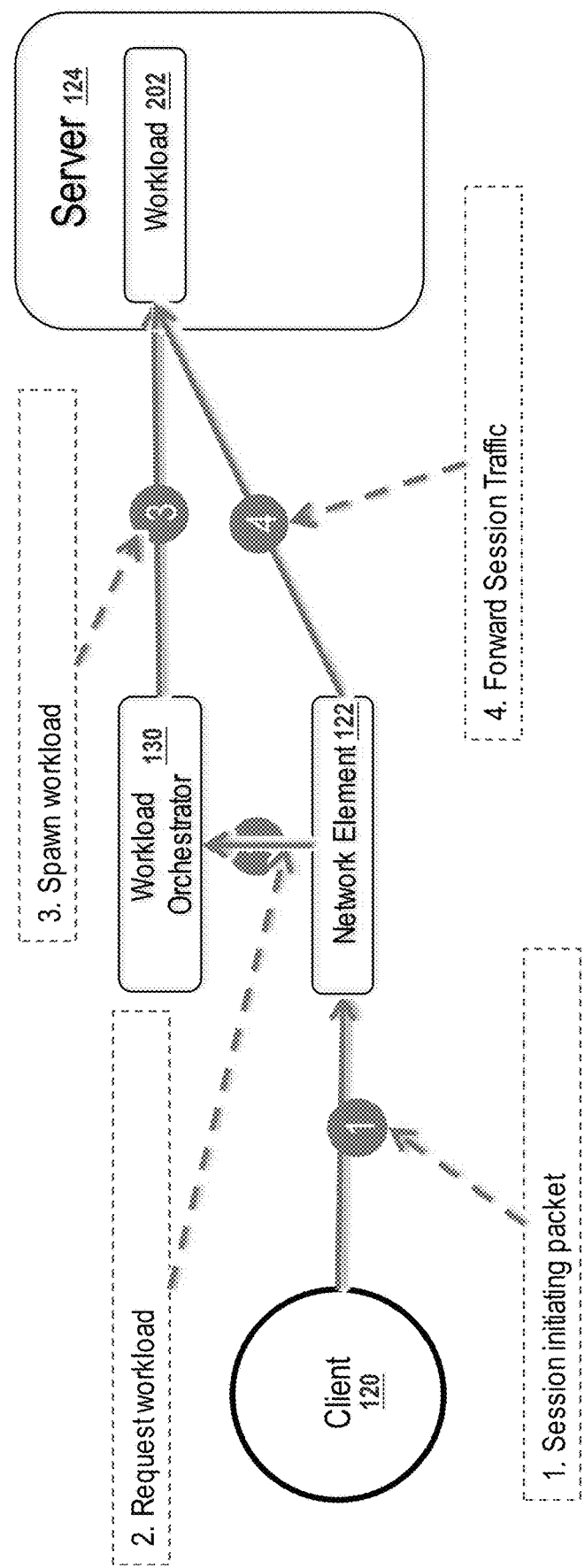
FIG. 2 illustrates an example data processing flow among elements of FIG. 1, in one embodiment.

FIG. 2 illustrates an example data processing flow among elements of FIG. 1, in one embodiment. For purposes of illustrating a clear example, FIG. 2 shows only client computing device 120, workload orchestrator 130, network element 122 and server 124. FIG. 3 illustrates an example processing flow that can be programmed to implement an embodiment. For purposes of illustrating a clear example, FIG. 3 will be described in connection with the structure and data flow of FIG. 2.

FIG. 3 and each other flow diagram herein illustrates an algorithm or plan that may be used as a basis for programming one or more of the functional modules of FIG. 1, FIG. 2 that relate to the functions that are illustrated in the diagram, using a programming development environment or programming language that is deemed suitable for the task. Thus, FIG. 3 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

Referring first to FIG. 3, in one embodiment, a processing flow 300 may be programmed in a network element and workload orchestrator first to perform receiving a packet from a client computer at the network element, as seen at block 302. In an embodiment, at step (1) of FIG. 2, the client computing device 120 transmits a digital data packet to network element 122 that contains protocol identifiers, request identifiers, payload data or other values that signal network element to initiate a session in relation to a service or application that is provided in network cloud 100. "Data" in this context is used broadly and can include packetized digital data representing voice or sound, video, or other media. The packet is received at network element 122. Initiating a session may occur via packets that include a parameterized URL carried via HTTP, a request in another protocol signified by a request identifier, or other data sufficient to inform an appropriately programmed network element that a session is initiated. "Session," in this context, refers to at least one request from a client and at least one response from a server, but any number of requests and responses could be involved for different services or applications.

At block 304, process 300 transmits a workload initiation request to the workload orchestrator. For example, in response to receiving a packet that signals the start of a session, at step (2) of FIG. 2, network element 122 is programmed to transmit a workload request to workload orchestrator 130. The workload request may be defined in a special-purpose protocol or may be carried in a URL via HTTP. The effect of a workload request is to request the workload orchestrator 130 to create or instantiate an executing process or workload 202 in a server 124 that is capable of servicing the session. A workload request may include a copy of all or part of the packet that was received at network element 122 to initiate a session, but is not required to include the packet.

At block 306, using the workload orchestrator, the process 300 selects a server instance that is available, closest and/or best for processing a session with the client computer. For example, at step (3) of FIG. 2, workload orchestrator 130 selects one particular server 124 from among a plurality of different servers in different locations. As the description of FIG. 1 has indicated, nodes 102, 104, 106, 108, 110, 112 may be distributed around network cloud 100 and may be distant from client computing device 120. Therefore, workload orchestrator 130 is programmed with instructions to select a particular node that is closest to client computing device 120, either logically or physically, and best for use. Proximity may be determined by inspecting metadata such as the source network address of client computing device 120 and selecting from a digitally stored mapping table that maps ranges of client addresses to corresponding addresses or identifiers of the nodes 102, 104, 106, 108, 110, 112. Or, proximity may be determined by inspecting a source address of the network element 122 that forwarded the workload request to the workload orchestrator 130 and using a similar mapping table. Using a mapping table is not required and the workload orchestrator may be programmed to use rules or other logic to select a node.

The best node 102, 104, 106, 108, 110, 112 that the workload orchestrator 130 selects is not required to be the physically or logically closest node. Instead, workload orchestrator 130 may be programmed to inspect values of metrics such as CPU load, storage usage, memory availability, or number of sessions, and to modify a selection of the node 102, 104, 106, 108, 110, 112 based on those values. For example, workload orchestrator 130 may be programmed to calculate a list of the top N nodes that are logically or physically closest to the client computing device 120, and then use values of the metrics to move down the list to reach a final selection. Threshold crossing, weighted blending, or other algorithmic approaches may be used to inspect values of the metrics to reach a final selection. Or, each node 102, 104, 106, 108, 110, 112 in the list may be scored using a weighted blending of metric values, and the node having the top score may be selected.

When a server instance has been selected, at block 308 of FIG. 3, the process transmits a request to the selected server instance to create a workload for servicing the session. For example, in response to receiving a workload request, the workload orchestrator 130 is programmed to spawn a workload 202 on a server 124 as indicated by step (3) of FIG. 2. "Workload," in this context, refers to an instance of a service, an instance of an application, a process, agent or daemon that is programmed or configured to service the session that client computing device 120 has initiated.

Optionally, at block 309, the process waits for an acknowledgment from the selected server instance indicating that the workload was created and is running; in some embodiments, if no acknowledgment is received, then the selection step of block 306 is performed again to result in selecting a different server. In some embodiments, the workload orchestrator can transmit a single packet to the server to cause the server to begin to spin up a workload, such that after completion of a TCP or HTTP session characterized by multiple roundtrips, the workload is ready and available. This approach may prevent the workload orchestrator from becoming a bottleneck in the system.

At block 310, the process transmits data identifying the selected server instance to the network element. Block 310 may involve reprogramming forwarding tables of the network element to cause all later packets for the same session, which are received at the network element from the client computing device, to be forwarded to the selected server instance, as seen at block 312. Thus, for packets other than the session initiation packet, the workload orchestrator 130 is bypassed and packets are forwarded from the network element 124 toward the server 124.

To implement the foregoing functions, the network element 122 such as a router or switch may be programmed with a daemon, agent or service, configured as an application or as a unit of an operating system, and having instructions effective to perform the specified functions. Similarly, workload orchestrator 130 may be programmed with instructions that are configured to perform the functions that have been described for it. In some embodiments, workload orchestrator 130 may be integrated with a network element 122 and the functions of workload orchestration described herein may form a part of the operating system or system services of the network element.

In some embodiments, a fully recursive approach may be programmed, in which a packet arrives at a node, a single packet trigger is sent to another node, work is performed on the current node until a condition occurs that causes it to need to move off the node, and a single packet trigger is sent to the other node, thus recursively invoking the process. In some embodiments, the foregoing approach may be implemented as a modified dynamic service function chain in which chain links are dynamic, functions instantiations are dynamic and created on the fly, the decision to move to a new node in the chain is based on environmental factors of the compute infrastructure such as running out of memory or too many threads rather than prescribed in advance, and a workload instantiation is primed with the single trigger packet so that the workload has already spun up, possibly with workload state passed in the trigger packet, before the handshake for the workload data connection has completed. A local decision of which node to process next may be complex, or simple. For example, a workload may determine to process an entire request, or pass it on at any time, provided that executing a pass occurs at an instant that the workload could recover from in terms of local state. The smallest amount of workload processing is 0, meaning that the workload simply is passed to another node.

2.3 Session Tear-Down or Termination

The process 300 optionally may include steps for tearing down or terminating a workload when a client-server session is complete. In some implementations, server-side code for a particular micro-service, application or server instance may implement instructions that detect when a client-server session, transaction or response is complete, and may automatically tear down or terminate a session or server instance in response. In other embodiments, at block 314, the network element may receive a server response or packet from the client computer that is associated with completing the session. That is, in certain protocols or request-response sessions, there may be packets that carry protocol identifiers, protocol values, or other data in headers or payloads that signal an end of a session. In response to detecting such a value, at block 316, the process transmits a workload termination request to the workload orchestrator 130. At block 318, using the workload orchestrator, the selected server instance is instructed to terminate.

Thus, a workload may be terminated after its sessions are concluded. Additionally or alternatively, process 300 may implement active timeout in which a workload is terminated at a set time after it is started. Additionally or alternatively, process 300 may implement idle timeout in which a workload is terminated a set period after it is idle. The specific workload termination technique can be specified by the workload, by the workload orchestrator, or via configuration data. In one embodiment, the process 300 further comprises executing one of: receiving a packet that is associated with completing the same client-server session, determining that a specified time has passed after transmitting the request to the selected server to create the workload, or determining that a specified idle time period has passed after transmitting the request to the selected server to create the workload and during which the selected server has been idle; and in response thereto, transmitting a workload termination request to the workload orchestrator, and the workload orchestrator instructing the selected server to terminate.

Or, the process 300 further comprises executing one of: receiving a packet that is associated with completing the same client-server session, determining that a specified time has passed after transmitting the request to the selected server to create the workload, or determining that a specified idle time period has passed after transmitting the request to the selected server to create the workload and during which the selected server has been idle; and in response thereto, instructing the selected server to terminate.

2.4 TCP-Kubernetes Session Example

Figure 4A:
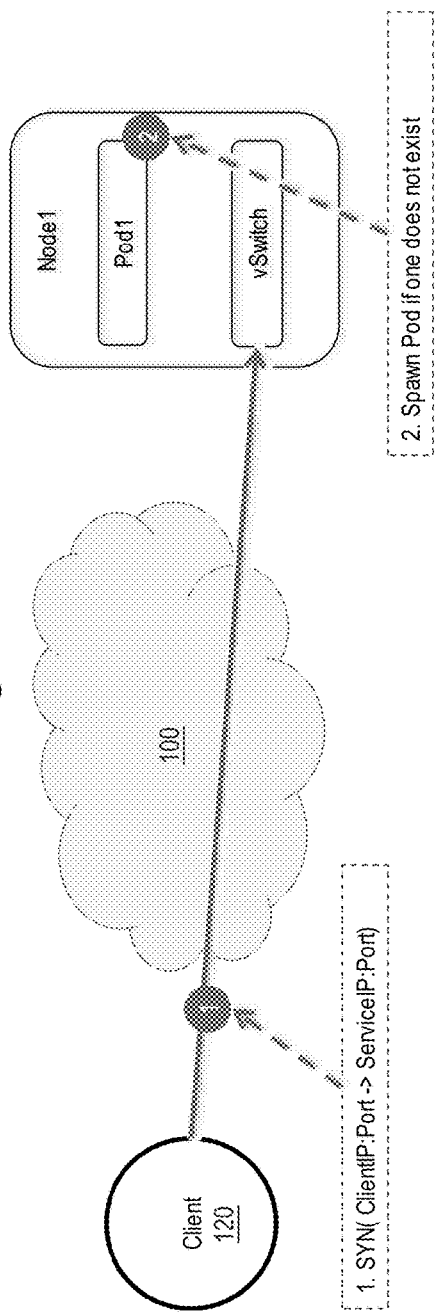
FIG. 4A illustrates an implementation example involving a TCP session using Kubernetes container virtualization.

FIG. 4A illustrates an implementation example involving a TCP session using Kubernetes container virtualization. At step (1), client computing device 120 transmits a SYN packet that identifies a client address, client port number, service address and service port number. The request transits cloud network 100 using the processes previously described for FIG. 2, FIG. 3 to reach a virtual switch (vSwitch) at Node1, which is a computing node. In response, the vSwitch causes spawning a pod denoted Pod1 if another available pod does not exist. The client session is processed by the pod.

2.5 HTTP-Service Mesh Example

Figure 4B:
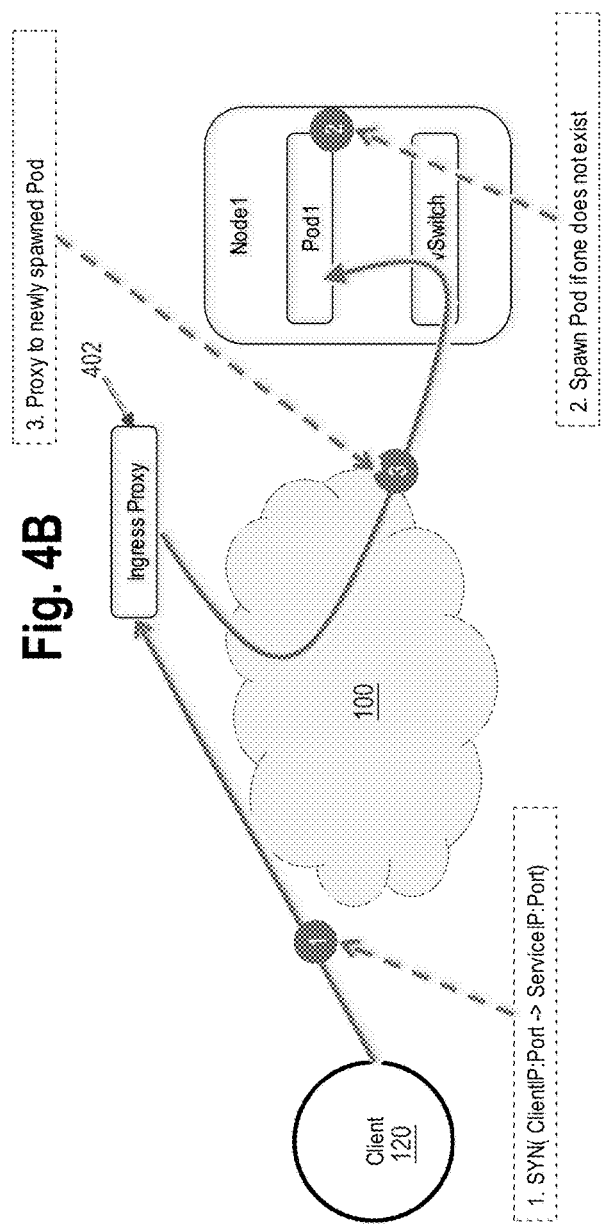
FIG. 4B illustrates an implementation example involving an HTTP request in a service mesh architecture.

FIG. 4B illustrates an implementation example involving an HTTP request in a service mesh architecture. At step (1), client computing device 120 transmits a SYN packet that identifies a client address, client port number, service address and service port number. The request transits cloud network 100 using the processes previously described for FIG. 2, FIG. 3 to reach a virtual switch (vSwitch) at Node1, which is a computing node. In response, the vSwitch causes spawning a pod denoted Pod1 if another available pod does not exist. The client session is processed by the pod. Furthermore, in response to initiation of a session, an ingress proxy 402 is created at any suitable location in cloud network 100. The ingress proxy 402 then proxies subsequent client packets or requests to Pod1.

2.6 Creating Networks of Workloads

The techniques described thus far have specified that a client network session can trigger directly the local creation of a workload for processing the session. Additionally or alternatively, similar techniques also may be used for a client network session to trigger local creation of a network of workloads in hierarchical or cascading manner. For example, a first workload, which has been instantiated in response to client-server traffic in the manner previously described, can transmit a second session initiation packet which triggers the creation of a second workload to process the second session. The second workload may be on the same server or a different server than the first workload.

With this approach, the process of FIG. 3 may be supplemented with instructions that cause, in response to receiving a second packet from the workload that is associated with initiating a second client-server session, selecting a second selected server, from among a plurality of available geographically or logically distributed servers in network edge computing nodes, to process the second client-server session; transmitting a request to the second selected server to create a second workload to process the second client-server session; forwarding one or more other packets associated with the same second client-server session to the second selected server.

Or, the process of FIG. 3 may be supplemented with instructions that cause, in response to receiving a second packet from the workload that is associated with initiating a second client-server session, transmitting a second workload request to the workload orchestrator; the workload orchestrator selecting a second selected server, from among a plurality of available geographically or logically distributed servers in network edge computing nodes, to process the second client-server session; the workload orchestrator transmitting a request to the second selected server to create a second workload to process the second client-server session; receiving, from the workload orchestrator, data identifying the second selected server; forwarding one or more other packets associated with the same second client-server session to the second selected server.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
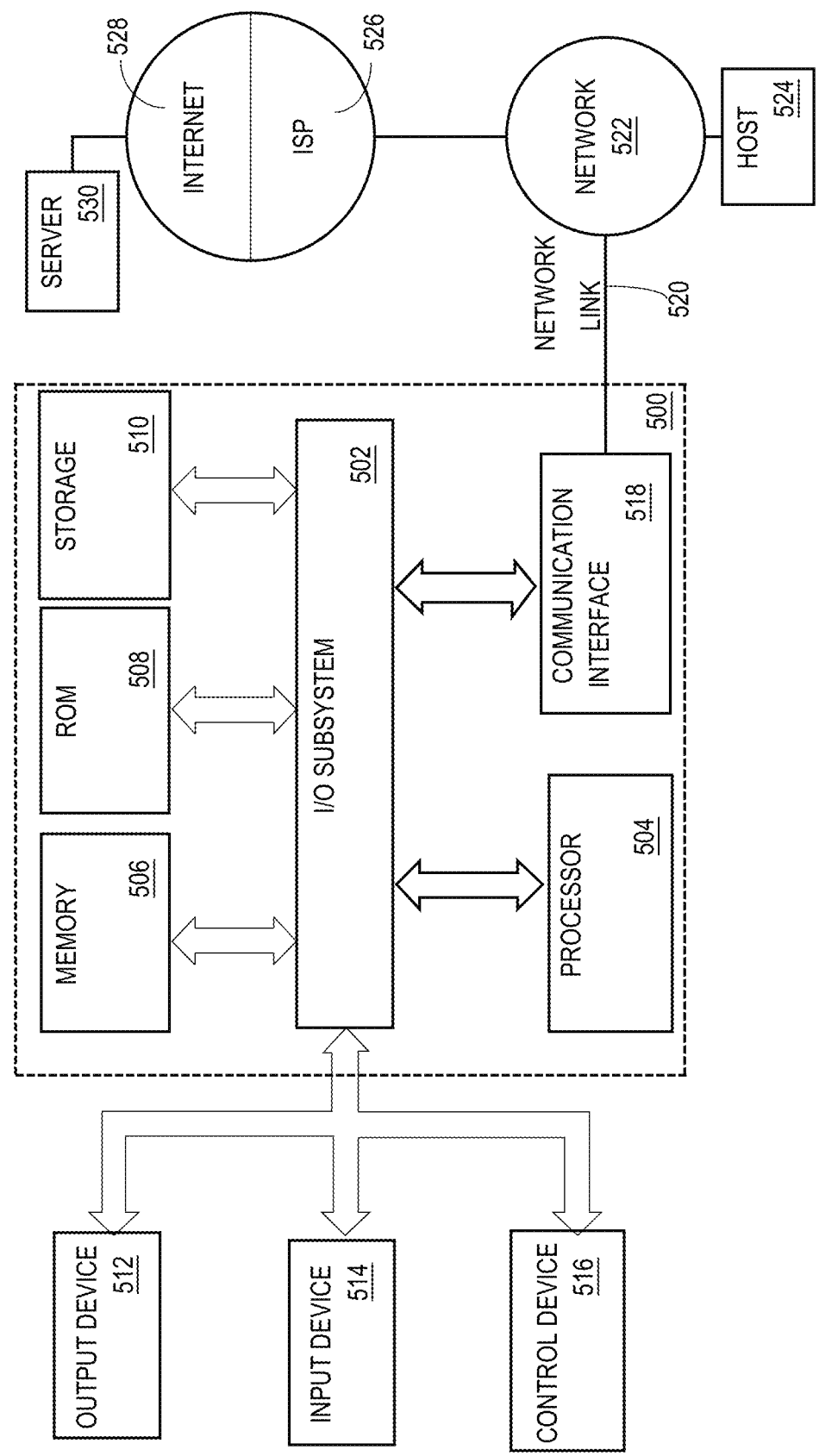
FIG. 5 illustrates a computer system with which some elements may be implemented, in one embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Benefits of Various Embodiments

The embodiments that have been described offer numerous technical benefits compared to past approaches. For example, localizing the network element that detects sessions and spawns workloads at edge compute nodes allows the existence of client sessions to direct where and when workloads are places in a highly distributed, scalable, and efficient manner. Consequently, the disclosed approaches can reduce the use of computing resources, storage, memory and network bandwidth by placing workloads at network edge nodes that are closest, whether logically or physically, to client computing devices that need services, and because there is no need to spin-up or instantiate virtual server instances to serve hypothetical or anticipated levels of client loads that never materialize. Given the present high cost of temporary use of virtual computing instances and storage in public cloud computing services, reducing the number of virtual server instances that are created will also reduce costs of enterprises to implement services.

What is claimed is:

1. A method comprising:
    receiving, at an edge node of a network, a first packet associated with initiating a client-server session;
    transmitting, by the edge node in response to receiving the first packet associated with initiating the client-server session, a workload request to a workload orchestrator of the network;
    receiving, at the edge node in response to transmitting the workload request, data identifying a selected server from the workload orchestrator, wherein receiving the data identifying the selected server comprises receiving the data identifying the selected server from the workload orchestrator in response to:
        the workload orchestrator selecting a list of a plurality of available geographically or logically distributed servers in network nodes to process the client-server session, the list of the plurality of available geographically or logically distributed servers arranged in an order of proximity to a client computing device that transmitted the first packet, wherein the list of the plurality of available geographically or logically distributed servers is selected based a weighted blend of metric values comprising one or more of a processor load, storage usage, a memory availability, and a number of sessions,
        the workload orchestrator selecting the selected server from among the list of the plurality of available geographically or logically distributed servers in network nodes to process the client-server session based on a score assigned to each of the plurality of available geographically or logically distributed servers, the workload orchestrator selecting the selected server with the highest score in the list,
        the workload orchestrator transmitting a request to the selected server to create a workload to process the client-server session, and
        the workload orchestrator sending, to the edge node, the data identifying the selected server; and
    forwarding, by the edge node, one or more other packets associated with the client-server session to the selected server bypassing the workload orchestrator, wherein the edge node stores the one or more other packets associated with the client-server session while waiting for the selected server to become known and forwards the one or more other packets associated with the client-server session to the selected server when the selected server becomes known.

2. The method of claim 1, further comprising:
    executing one of the following: receiving a second packet that is associated with completing the client-server session, determining that a specified time has passed after transmitting the request to the selected server to create the workload, and determining that a specified idle time period has passed after transmitting the request to the selected server to create the workload and during which the selected server has been idle; and
    in response thereto, transmitting a workload termination request to the workload orchestrator, and the workload orchestrator instructing the selected server to terminate the client-server session.

3. The method of claim 1, further comprising the workload orchestrator selecting the selected server, from among the plurality of available geographically or logically distributed servers, to process the client-server session by selecting a particular server that is logically closest to the client computing device that transmitted the first packet that is associated with initiating the client-server session.

4. The method of claim 1, further comprising the workload orchestrator selecting the selected server, from among the plurality of available geographically or logically distributed servers, to process the client-server session by selecting a particular server that is physically or geographically closest to the client computing device that transmitted the first packet that is associated with initiating the client-server session.

5. The method of claim 1, wherein the workload orchestrator, the selected server, and the plurality of geographically or logically distributed servers are in a public cloud computing environment.

6. The method of claim 5, wherein the selected server is a virtual computing instance in the public cloud computing environment.

7. The method of claim 5, wherein the first packet is a transmission control protocol (TCP) SYN packet, and wherein the selected server is a virtual computing instance in the public cloud computing environment using Kubernetes container virtualization.

8. The method of claim 5, wherein the first packet is a transmission control protocol (TCP) SYN packet having an HTTP request in a payload, and wherein the selected server is a virtual computing instance in the public cloud computing environment implementing a micro-service in a service mesh architecture.

9. The method of claim 1, further comprising:
receiving, at the edge node of the network, a second packet associated with initiating another client-server session;
in response to receiving the second packet from the workload that is associated with initiating the another client-server session, transmitting another workload request to the workload orchestrator;
the workload orchestrator selecting another selected server, from among the plurality of available geographically or logically distributed servers in the network nodes, to process the another client-server session;
the workload orchestrator transmitting the another request to the another selected server to create another workload to process the another client-server session;
receiving, from the workload orchestrator, the data identifying the another selected server; and
forwarding one or more another packets associated with the another client-server session to the another selected server.

10. A non-transitory computer readable medium that stores a set of instructions which when executed perform a method comprising:
receiving, from an edge node of a network at a workload orchestrator, a workload request in response to the edge node receiving a first packet associated with initiating a client-server session;
selecting, by the workload orchestrator in response to receiving the workload request in response to receiving the first packet that is associated with initiating the client-server session, a list of a plurality of available geographically or logically distributed servers in network nodes to process the client-server session, the list of the plurality of available geographically or logically distributed servers arranged in an order of proximity to a client computing device that transmitted the first packet, wherein the list of the plurality of available geographically or logically distributed servers is selected based a weighted blend of metric values comprising one or more of a processor load, storage usage, a memory availability, and a number of sessions;
selecting, by the workload orchestrator, a selected server from among the list of the plurality of available geographically or logically distributed servers in a plurality of network nodes, to process the client-server session based on a score assigned to each of the plurality of available geographically or logically distributed servers, the workload orchestrator selecting the selected server with the highest score in the list;
transmitting, by the workload orchestrator, the workload request to the selected server to create a workload to process the client-server session; and
sending, by the workload orchestrator, data identifying the selected server to the edge node, wherein the edge node is operative to forward one or more other packets associated with the client-server session to the selected server bypassing the workload orchestrator, wherein the edge node stores the one or more other packets associated with the client-server session while waiting for the selected server to become known and forwards the one or more other packets associated with the client-server session to the selected server when the selected server becomes known.

11. The non-transitory computer readable medium of claim 10, wherein the method further comprising:
receiving a second packet that is associated with completing the client-server session, and
in response to receiving the second packet, transmitting an instruction to the selected server to terminate the client-server session.

12. The non-transitory computer readable medium of claim 10, wherein selecting the selected server, from among the plurality of available geographically or logically distributed servers, to process the client-server session comprises selecting a particular server that is logically closest to the client computing device that transmitted the first packet that is associated with initiating the client-server session.

13. The non-transitory computer readable medium of claim 10, wherein selecting the selected server, from among the plurality of available geographically or logically distributed servers, to process the client-server session by selecting a particular server that is physically or geographically closest to the client computing device that transmitted the first packet that is associated with initiating the client-server session.

14. The non-transitory computer readable medium of claim 10, wherein the selected server and the plurality of geographically or logically distributed servers are in a public cloud computing environment.

15. The non-transitory computer readable medium of claim 14, wherein the selected server comprises a virtual computing instance in the public cloud computing environment.

16. The non-transitory computer-readable medium of claim 14, wherein the first packet is a transmission control protocol (TCP) SYN packet, and wherein the selected server is a virtual computing instance in the public cloud computing environment using Kubernetes container virtualization.

17. The non-transitory computer-readable medium of claim 14, wherein the first packet is a transmission control protocol (TCP) SYN packet having an HTTP request in a payload, and wherein the selected server is a virtual computing instance in the public cloud computing environment implementing a micro-service in a service mesh architecture.

18. The non-transitory computer-readable medium of claim 10, wherein the method further comprising:
   executing one of the following: receiving a second packet that is associated with completing the client-server session, determining that a specified time has passed after transmitting the request to the selected server to create the workload, and determining that a specified idle time period has passed after transmitting the request to the selected server to create the workload and during which the selected server has been idle; and
   and in response thereto, instructing the selected server to terminate the client-server session.

19. The non-transitory computer-readable medium of claim 10, further comprising:
   in response to receiving a second packet from the workload that is associated with initiating another client-server session, selecting another selected server, from among the plurality of available geographically or logically distributed servers in the network nodes, to process the another client-server session;
   transmitting another request to the another selected server to create another workload to process the another client-server session; and
   forwarding one or more another packets associated with the another client-server session to the another selected server.

20. A system comprising:
   a memory device; and
   a processor coupled to the memory device, the processor being operative to:
      receive, from an edge node of a network, a workload request in response to the edge node receiving a first packet associated with initiating a client-server session;
      select, in response to receiving the workload request, a list of a plurality of available geographically or logically distributed servers in network nodes to process the client-server session, the list of the plurality of available geographically or logically distributed servers arranged in an order of proximity to a client computing device that transmitted the first packet, wherein the list of the plurality of available geographically or logically distributed servers is selected based a weighted blend of metric values comprising one or more of a processor load, storage usage, a memory availability, and a number of sessions,
      select a selected server from among the list of the plurality of available geographically or logically distributed servers in a plurality of network nodes, to process the client-server session based on a score assigned to each of the plurality of available geographically or logically distributed servers, the workload orchestrator selecting the selected server with the highest score in the list;
      transmit the workload request to the selected server to create a workload to process the client-server session; and
      send data identifying the selected server to the edge node, wherein the edge node is operative to forward one or more other packets associated with the client-server session to the selected server, wherein the edge node stores the one or more other packets associated with the client-server session while waiting for the selected server to become known and forwards the one or more other packets associated with the client-server session to the selected server when the selected server becomes known.

\* \* \* \* \*